United States Patent
Quintana et al.

(10) Patent No.: US 11,772,813 B2
(45) Date of Patent: Oct. 3, 2023

(54) METHOD AND A DEVICE FOR MANAGING RISKS AND ALERTS

(71) Applicant: AIRBUS HELICOPTERS, Marignane (FR)

(72) Inventors: Jean-Louis Quintana, Nailloux (FR); Herve Rouat, Istres (FR); Jean-Marc Quiot, Salon de Provence (FR); Marc Greiller, Marignane (FR)

(73) Assignee: AIRBUS HELICOPTERS, Marignane (FR)

( * ) Notice: Subject to any disclaimer, the term of this patent is extended or adjusted under 35 U.S.C. 154(b) by 248 days.

(21) Appl. No.: 17/200,837

(22) Filed: Mar. 14, 2021

(65) Prior Publication Data

US 2021/0309385 A1 Oct. 7, 2021

(30) Foreign Application Priority Data

Apr. 7, 2020 (FR) ...................................... 2003444

(51) Int. Cl.
*B64D 45/00* (2006.01)

(52) U.S. Cl.
CPC ...... *B64D 45/00* (2013.01); *B64D 2045/0085* (2013.01)

(58) Field of Classification Search
CPC .... G08G 5/003; G08G 5/0086; G08G 5/0034; G08G 5/006; G08G 5/0091; B64G 1/242
See application file for complete search history.

(56) References Cited

U.S. PATENT DOCUMENTS

| | | |
|---|---|---|
| 2010/0161157 A1 | 6/2010 | Guilley et al. |
| 2012/0004794 A1 | 1/2012 | Guilley et al. |
| 2012/0025032 A1* | 2/2012 | Hopdjanian ............ B64C 27/14 903/905 |

(Continued)

FOREIGN PATENT DOCUMENTS

| | | |
|---|---|---|
| EP | 0964381 A2 | 12/1999 |
| EP | 2647959 A1 | 10/2013 |

(Continued)

OTHER PUBLICATIONS

French Search Report for French Application No. FR2003444, Completed by the French Patent Office, dated Oct. 6, 2020, 11 pages.

(Continued)

*Primary Examiner* — Shon G Foley
(74) *Attorney, Agent, or Firm* — Brooks Kushman P.C.

(57) ABSTRACT

A method of managing risks and alerts for a system. The system includes source modules and auxiliary modules for identifying actual or potential risks of failures or of malfunctions of the system. A central module of the system serves to determine actual or potential risks of failures or of malfunctions of the system and actual or potential risks associated with parameters external to the system and that might have impacts on operation of the system. Then, an overall risk level is determined by combining the various actual or potential risks and their effects on the system, and then an action and information interface may be controlled as a function of the overall risk level, e.g. for modifying a display of information relating to the system and/or to its environment, or indeed for automatically performing an action on the system.

20 Claims, 4 Drawing Sheets

(56) References Cited

U.S. PATENT DOCUMENTS

| | | |
|---|---|---|
| 2013/0268146 A1 | 10/2013 | Baudry |
| 2016/0130013 A1* | 5/2016 | Rangan ................ B64D 45/00 340/963 |
| 2018/0164825 A1* | 6/2018 | Matus ............... B60W 50/0098 |
| 2022/0334595 A1* | 10/2022 | Famularo ............... B64C 13/18 |

FOREIGN PATENT DOCUMENTS

| | | |
|---|---|---|
| EP | 2873038 A1 | 5/2015 |
| FR | 2954842 A1 | 7/2011 |
| FR | 3037155 A1 | 12/2016 |
| WO | 2014013226 A1 | 1/2014 |

OTHER PUBLICATIONS

Chad Goerzen et al: "Minimal risk motion planning: a new planner for autonomous UAVs in uncertain environments", AHS International Specialists Meeting on Unmanned Rotorcraft, Tempe, AZ. Jan. 27, 2011. 21 pages.

Viebahn Von H: "Method for Detecting and Avoiding Flight Hazards", Proceedings of SPIE, IEEE, US, vol. 3088, Jan. 1, 1997. 7 pages.

* cited by examiner

Fig.7

METHOD AND A DEVICE FOR MANAGING RISKS AND ALERTS

CROSS REFERENCE TO RELATED APPLICATIONS

This application claims priority to French patent application No. FR 2003444 filed on Apr. 7, 2020, the disclosure of which is incorporated in its entirety by reference herein.

BACKGROUND OF THE INVENTION

(1) Field of the Invention

The present invention lies in the field of monitoring a system and in particular a vehicle.

The present invention relates to a method and to a device for managing risks and alerts for a system such as a vehicle, in particular an aircraft, as well as to an aircraft equipped with such a management and alert device.

(2) Description of Related Art

A system, whether it be a mechanical one, a fuel-burning one, or one that uses any other type of technology, can be subjected to malfunctions or faults that can degrade operation of it or even prevent it from operating. Such faults or malfunctions can have an impact on a component of the system. For example, such an effect might be failure of or significant wear on a component, or indeed breakage of the component. Such faults or malfunctions can also be found in a subsystem of the system.

It is therefore advantageous to be able to detect such malfunctions or faults and in particular to anticipate occurrence of them and also the consequences of them.

Devices and methods of monitoring a system have been put in place in various technological fields, such as for conventional fuel-burning and nuclear power plants, as well as for vehicles, in particular.

Indeed, early detection of the occurrence of a fault, or detection of a first sign of the presence of a fault makes it possible to limit the effect of the fault on the system by, for example, shutting down the system quickly and carrying out an appropriate maintenance operation. In that way, the maintenance costs resulting from the fault are limited, as is the downtime of the system.

Furthermore, when, for example, the system is a vehicle and in particular an aircraft, certain faults may have effects on the reliability and/or safety of the system, in particular on the flight of the aircraft. It is therefore advantageous to be able to detect as early as possible or indeed to anticipate occurrences of faults and the associated risks, firstly so as to optimize the maintenance costs of the system and secondly so as to improve the reliability and/or safety of the system.

For example, Document EP 2 873 038 discloses a method of generating probability data for use in assessing the performance of a system and of a mission involving the system. That method implements firstly a system diagnosis model describing symptoms and failures of the system, and secondly a mission impact model describing effects of the system on an ability to perform the mission. That method combines data from the system diagnosis model and from the mission impact model to form a combined model. Finally, that method includes receiving observation data regarding the state of the system in combination with the combined model to generate probability data for use in assessing performance of the system and of the mission.

That method can then compute a prior probability of each of the potential faults at the commencement of a mission, and a priori probability of a fault from the commencement of the mission to a phase that the combined model indicates as being affectable by the fault. That method can also compute a posterior probability of the mission failing, or of a failure affecting a component of the system.

Furthermore, other parameters external to the system can also affect operation of the system and thus constitute a risk for such operation of the system. For example, external conditions can have an effect on the efficiency of a fuel-burning system, such as an internal combustion engine with which a vehicle is equipped. The terrain over which the vehicle travels also influences such operation, modifying, for example, the need for power to enable the vehicle, and in particular, an aircraft, to operate safely.

In the aviation field, there is known, for example, a method of monitoring the flight data of an aircraft, and, in particular, of a helicopter, that method being known as "Helicopter Flight Data Monitoring" or "HFDM". That method analyzes various types of data recorded during flight, namely flight data such as altitude, speed relative to the ground and vertical speed of the aircraft, parameters related to operation of the engine(s) of the aircraft, and external environmental data such as weather data and the presence of cloud cover, for example.

That monitoring method thus makes it possible to determine the levels of risk associated with a helicopter, but only after the flights of the helicopter, by automatically detecting situations that could have been safer or that had a risk of giving rise to an incident or an accident.

Furthermore, Document EP 0 964 381 discloses a method and a device for prioritizing the risks or hazards to which an aircraft may be subjected. That device receives risk or hazard information of various kinds, e.g. weather risks, risks related to air traffic, or indeed risks related to terrain. At least two criteria are associated with each risk, in particular the time to the aircraft being endangered by the risk, and a severity associated with said risk. The severity of a risk is determined from a database of past incidents relating to that type of risk. Those criteria are combined independently for each risk, and therefore without any combination between them, in order to determine a threat value associated with that risk. Then, the threat value is compared with a threshold, and the crew of the aircraft can be alerted to the risk if the threshold is exceeded. However, if threat values associated with two or more risks exceed the threshold simultaneously, prioritization is performed and only the risk with the highest threat value is presented to the crew of the aircraft.

However, those various methods or devices tend to process risks of different origins independently, without any overall processing of the potential risks that are identified. The various possible origins of the risks are, for example, malfunctions and faults intrinsic to the system, risks related to external conditions, in particular risks related to the environment of the system, and also possibly risks related to the state of fatigue or of stress of an operator or of a pilot or driver when the system is a vehicle.

Indeed, the state of an operator, or of a pilot or driver when the system is a vehicle, can also influence operation and efficiency of a system. The state of an operator or of a pilot or driver can include physical state, e.g. state of fatigue, as well as possibly physiological state, e.g. state of stress, or indeed psychological state. Indeed, by influencing capacity to react, reaction time, decisions, and initiatives, the state of an operator or of a pilot or driver can affect proper operation of the system and how effective it is. For example, the state of a pilot or driver can have a considerable influence on the behavior of a vehicle, in particular in terms of safety.

Furthermore, when the system is a vehicle, and in particular an aircraft, how far advanced the journey and/or the mission of the vehicle is/are and how well the journey and/or mission of the vehicle is/are going can also have an effect on the risk of failure or malfunction of the vehicle, e.g. due to the complexity of the mission, to the length of time it lasts, to its environment, or to failure of a phase of the mission or indeed to changes that can occur during the mission. How far advanced a journey and/or a mission is/are and how well a journey and/or a mission is/are going can also have a direct or indirect effect on the state of the pilot or driver of the vehicle, e.g. on the state of fatigue or state of stress of the pilot or driver.

The prior art also includes Document US 2010/0161157 that discloses a device for managing alerts and tasks of an aircraft. That device includes an alert module for generating alerts as a function of risks of failure or malfunction of the aircraft, a task management module for generating a task as a function of the alerts, and a plurality of display modules. The alerts concern parameters relating to the aircraft, e.g. detecting a fire, managing an electric or hydraulic network, managing flight controls, conditioning the air of the cabin, etc.

Furthermore, Document EP 2 647 959 discloses a method of adapting a man-machine interface as a function of the pilot's physical and physiological state, which state is characterized by a functional level of the pilot. That functional level of the pilot is determined on the basis of characteristics of the pilot, of the tasks to be performed, and of the state of the aircraft.

Document FR 2 954 842 discloses a task management system for piloting an aircraft. That system includes means for detecting alerts relating to the flight system and receiving the status of the flight system, as well as means for managing the alerts that display the alerts and the tasks to be performed following those alerts.

Document FR 3 037 155 discloses a method of managing failures for an engine management system of an aircraft. Each failure can be classified as either one of two levels of failure.

The publication by C. Goerzen and M. Whalley, "Minimal Risk Motion Planning: a New Planner for Autonomous UAVs in Uncertain Environments", Jan. 27, 2011 is also known, that publication describing a flight planner for drones that takes into account optimized risk management, in particular by combining various performance characteristics of the aircraft in order to minimize the risks. A risk level for the flight is computed by combining risk factors associated with respective ones of the identified risks.

Finally, the publication by H. Von Viebahn, "A Method for Detecting and Avoiding Flight Hazards", January 1997, describes a method of detecting obstacles and of avoiding collisions during flights of an aircraft by independently taking into account the potential risks associated with weather and with detection of stationary or moving obstacles.

Consequently, the prior art proposes solutions that identify potential or real risks, without anticipating risk situations, without proposing any alternative solutions for overcoming the identified risk situation, or any solutions for addressing the cause of an identified risk situation and thus avoid being faced with such a risk situation.

BRIEF SUMMARY OF THE INVENTION

An object of the present invention is therefore to propose a method and a device for managing risks and alerts that make it possible to overcome the above-mentioned limitations and that aim to identify the potential and real risks relating to a system and to identify their effects on the system so as to anticipate a risk situation and so as to limit the probability of being faced with such a risk situation.

For example, the present invention provides a method of managing risks and alerts for a system. Such a system includes, in particular:

a plurality of source modules for identifying actual or potential risks of failure or of malfunction of the system;

a plurality of auxiliary modules for identifying actual or potential risks that are related to parameters external to the system and that might have impacts on operation of the system;

a central module connected to the source modules and to the auxiliary modules, the central module including at least one computer and receiving information relating to the actual or potential risks of failure or of malfunction of the system; and at least one action and information interface for an operator of the system, said at least one action and information interface being connected to the central module.

For example, the system is a mechanical system or a complex system. A mechanical system or a complex system includes various elements and devices, e.g. mechanical power transmission devices, one or more engines or motors, such as fuel-burning engines and/or electric motors, or indeed devices for monitoring and controlling the system. For example, such a system is a vehicle, such as, in particular, an aircraft. A vehicle may also include one or more location devices, such as satellite location receivers, inertial units, and control members for steering the vehicle.

The computer of the central module may comprise at least one processor and at least one memory, at least one integrated circuit, and at least one programmable system or indeed at least one logic circuit, these examples not limiting the scope given to the expression "computer". For example, the memory may store one or more databases as well as one or more algorithms for the purpose of implementing the method of the invention.

The computer may be a computer dedicated to performing the method of the invention, or it may be a shared computer having multiple functions. To this end, the computer may be integrated into the system. For example, the computer may be integrated into an avionics device of an aircraft when the mechanical system is an aircraft.

The method of managing risks and alerts for a system of the invention is remarkable in that it comprises the following steps:

determining at least one actual or potential risk of failure or of malfunction of the system by means of at least one source module;

determining at least one actual or potential risk that are related to parameters external to the system and that might have impacts on operation of the system, by means of at least one auxiliary module;

determining an overall risk level by combining the actual or potential risks and their effects on the system by means of the central module; and controlling said at least one action and information interface as a function of the overall risk level.

The determination step for determining at least one actual or potential risk of failure or of malfunction of the system is performed by means of at least one source module and makes it possible to identify one or more actual or potential risks that might affect operation of the system and that might, in the short or medium term, give rise to at least one failure or malfunction of the system.

In order to determine such an actual or potential risk, each source module monitors an element, a device, a subsystem or a parameter of the system and, for example, analyzes the current data relating to said element, said device, said subsystem or said parameter. For this purpose, each source module may include one or more sensors or a specific device in order to monitor an element, a device, a subsystem, or a parameter of the system.

Each source module may also optionally use previously stored past data relating to said element, said device, said subsystem, or said parameter, and simultaneously analyze the current data and the past data. For example, the current data may be compared with said past data in order to determine a deviation or a difference, and in order to deduce therefrom an actual or potential risk.

Such past data may be stored in a memory, e.g. in the form of a database. Said memory may be connected to a source module or to the central module, or indeed be integrated into a source module or into the central module.

The determination step for determining at least one actual or potential risk that is related to one or more parameters external to the system is performed by means of at least one auxiliary module and makes it possible to identify one or more actual or potential risks related to one or more external parameters and that might affect operation of the system, or indeed that might, in the short term, give rise to at least one failure or malfunction of the system.

In order to determine such an actual or potential risk, each auxiliary module monitors at least one parameter external to the system and, for example, performs analysis of current data relating to said at least one parameter. For this purpose, each auxiliary module may include one or more sensors in order to monitor at least one parameter external to the system.

Each auxiliary module may also optionally use a forecast relating to said at least one parameter external to the system, and analyze said forecast in order to determine an actual or potential risk relating to said at least one parameter.

Such a forecast may be stored in a memory prior to starting up the system. Said memory may be connected to an auxiliary module or to the central module, or indeed be integrated into an auxiliary module or into the central module.

An auxiliary module may also include a receiver in order to receive such a forecast relating to said at least one parameter external to the system.

Each auxiliary module may also optionally use past data relating to said parameter, and simultaneously analyze the current data, the forecasts and/or the past data. For example, the current data and/or the forecasts may be compared with said past data in order to determine a deviation or a difference, and in order to deduce therefrom an actual or potential risk.

Such past data may be stored in a memory, e.g. in the form of a database. Said memory may be connected to a source module or to the central module, or indeed be integrated into a source module or into the central module.

Then, the step of determining an overall risk level is performed by means of the central module, by combining the previously established actual or potential risks relating to the system and to the parameters external to the system, and their effects on the system. In particular, the computer of the central module makes it possible to determine the overall risk level by using the actual or potential risks relating to the system and to the parameters external to the system and provided respectively by at least one source module and by at least one auxiliary module.

In addition, the central module may optionally use past data relating to the system and to operation of said system, as well as to the effects of said actual or potential risks. The central module can then simultaneously analyze the actual or potential risks relating to the system and to the parameters external to the system, as well as the past data.

Such past data may be stored in a memory, e.g. in the form of a database. The memory may be connected to the central module or indeed be integrated into the central module.

The overall risk level may, for example, be equal to an arithmetic sum or to a quadratic sum of the actual or potential risks. For example, the overall risk level may also be determined by a specific formula or indeed by an algorithm.

Finally, the control step for controlling said at least one action and information interface is performed as a function of the risk level combined by means of the central module. Said at least one action and information interface is controlled by the central module.

The control step for controlling said at least one action and information interface can thus serve to inform an operator of the system of the overall risk level, to alert said operator if the overall risk level so requires, to propose one or more actions on the system to said operator as a function of said overall risk level, or even to act automatically on the system if the overall risk level so requires, e.g. in order to preserve the system.

For example, said at least one action and information interface may include a display device, and said control step for controlling said at least one action and information interface may include a display substep for displaying the overall risk level and/or information relating to the system and/or to its environment on the display device.

For example, information relating to the system may include one or more actions to be performed on the system by the operator as a function of the overall risk level.

In another example, said at least one action and information interface may include a warning device and the control step for controlling said at least one action and information interface may include a warning substep alerting an operator of the system as a function of the overall risk level.

In another example, said at least one action and information interface may include a warning device, and the control step for controlling said at least one action and information interface may include a warning substep alerting an operator of the system as a function of the overall risk level. For example, the alert may be visual, vibratory, or audible.

In another example, said at least one action and information interface may include a control device for controlling the system, and the control step for controlling the action and information interface may include an action substep performed by means of the control device. In this way, at least one action on the system may be performed automatically by means of the control device as a function of the overall risk level.

In another example, said at least one action and information interface may include a display device, a validation device and a control device for controlling the system. The control step for controlling the action and information interface may include a display substep displaying, on the display device, one or more actions to be performed, a validation substep for validation by an operator of the system, and an action substep performed by means of the control device. In this way, the operator may validate at least one action proposed by means of the validation device, or indeed all of the actions proposed and each action validated may be performed automatically by means of the control device.

The validation device may be the display device, which is, for example, a touch screen, or else a button, a keyboard or any appropriate device.

In this way, the method of the invention advantageously enables the various risks relating to the system, to its environment, and to operation of the system to be processed jointly and in overall manner. Therefore, the overall risk level is determined by analyzing the actual or potential risks relating to the system and to its environment dependently so as to reduce the final risk relating to the system, unlike with the prior art techniques that analyze the risks cumulatively and independently from one another.

The method of the invention thus makes it possible to identify the effects on the system acting simultaneously and dependently so as to anticipate a risk situation and so as to limit the probability of entering such a risk situation.

In addition, the method of the invention also makes it possible to reassure the operator of the system by means of the overall management of the risks and, as a result, to reduce the stress on the operator and, de facto, to improve the efficiency of the operator.

The method may also have one or more of the following characteristics.

In one aspect, the determination step for determining an overall risk level may be performed while using a weighting associated with each actual or potential risk relating to the system or to its environment. Said weighting advantageously makes it possible to prioritize each element, each device, each subsystem, and each parameter of the system as well as the parameters external to the system, and to apply weighting coefficients to each risk as a function of this prioritization, as a function of the importance of each element, each device, each subsystem, and each parameter of the system, as well as of the parameters external to the system and as a function of the effects of a fault on each element, each device, or each subsystem, e.g. on operation of the system.

The overall risk level may, for example, then be equal to a weighted arithmetic sum or to a weighted quadratic sum of the actual or potential risks. For example, the overall level of risk may also be determined by a specific formula or indeed by an algorithm, e.g. involving said weighting coefficients.

The weighting coefficients associated with each risk may be stored in a memory, e.g. in the form of a database, connected to the central module or indeed be integrated into the central module.

In one aspect, the step of determining an overall risk level may be performed by means of an expert system, of artificial intelligence, or indeed of a neuronal system.

In one aspect, the determination step for determining at least one actual or potential risk of failure or of malfunction of the system may comprise the following substeps:
measuring a characteristic of an element of the system, a characteristic of a device of the system, a characteristic of a subsystem, or at least one parameter of the system;
analyzing said at least one characteristic; and
computing at least one actual or potential risk of failure or of malfunction of the system, which risk is associated with said at least one characteristic.

In one aspect, the determination step for determining at least one actual or potential risk associated with at least one parameter external to said system may comprise the following substeps:
measuring at least one parameter external to the system;
analyzing said at least one external parameter; and
computing at least one actual or potential risk associated with the at least one parameter external to the system.

In one aspect, one or more source modules may make it possible to monitor an element or a device of the system and to determine at least one actual or potential risk relating to said element or to said device of the system. For example, a module makes it possible to monitor a mechanical power transmission device or an engine of the system and to determine at least one actual or potential risk relating to said mechanical power transmission device or to said engine. For example, a source module is a controller of the "Full Authority Digital Engine Control" (FADEC) type, connected to at least one engine and enabling a health check to be performed on an engine.

One or more source modules may also make it possible to monitor a subsystem of the system, which subsystem includes a plurality of elements and/or a plurality of devices, and to determine at least one actual or potential risk relating to said subsystem. For example, a source module makes it possible to monitor a power plant of the system, which power plant includes at least one mechanical power transmission device and one or more engines. The source module then makes it possible to determine at least one actual or potential risk relating to said power plant.

Furthermore, an actual or potential risk associated with a subsystem may also be determined by combining the risks associated with the elements and devices making up the subsystem. In such a situation, the source modules determining the risks associated with said elements and with said devices making up the subsystem can be interconnected in order to determine such an actual or potential risk associated with the subsystem, independently of the central module.

However, such risks associated with the elements and with the devices making up the subsystem may be combined by the central module in order to determine the actual or potential risk associated with the subsystem.

In addition, one or more source modules may also make it possible to monitor operating parameters of the system itself and to determine at least one actual or potential risk relating to each of said parameters, e.g. when a parameter is coming close to a limit or to a threshold. For example, a module makes it possible to monitor the navigation parameters of an aircraft, such as its speed, its altitude and its attitude, and to determine at least one actual or potential risk related to said parameters. For example, a source module is a monitoring device for monitoring the system and/or its performance.

In one aspect, one or more auxiliary modules make it possible to monitor one or more parameters of the environment of the system that might affect operation of the system, and to determine at least one actual or potential risk relating to said parameter(s) of the environment.

A parameter external to the system may be the atmospheric conditions. An auxiliary module may include one or more sensors, e.g. for measuring the weather conditions and in particular the temperature and the atmospheric pressure that are external to the system, or indeed the wind to which the system is subjected. An auxiliary module may also be connected to a memory containing weather information such as the latest weather forecast for the zone in which the system is situated. An auxiliary module may also include a receiver in order to receive weather information, in particular the latest weather forecast for the zone in which the system is situated.

For example, a parameter external to the system may be the state of an operator of the system, an auxiliary module monitoring the state of said operator, from the points of view both of the operator's physical state and of the operator's mental and/or psychological state, and determining whether said state of the operator is consistent with managing or controlling, piloting, or driving the system. For example, said auxiliary module may include sensors measuring physical parameters of the operator, such as the operator's heart rate, the operator's temperature, the operator's visual acuity, etc. The auxiliary module can thus have access to a history of said operator that is stored in a memory, which, for example, may be in the form of a database. For example, the history includes information on the experience of the operator, the tasks the operator masters, and the training the operator has done.

A parameter external to the system may also be the tasks to be performed by the system, and how they are going and how far advanced they are. For example, said tasks can be grouped together in the form of a mission to be performed when the system is a vehicle and/or of a flight plan when the system is, in particular, an aircraft. The tasks may be stored in a memory. The auxiliary module may then analyze how far advanced the tasks are and how they are going. Such an auxiliary module then has access to the memory containing the tasks. A level of difficulty and/or a required level of experience may be associated with each task.

When the system is a vehicle, and in particular an aircraft, a parameter external to the system may also be the relief of the terrain around the system, as well as any obstacles that might be situated on the terrain. The auxiliary module may then include sensors in order to identify the relief and the obstacles in real time. The auxiliary module may also use a database stored in the memory and containing the information relating to said terrain, its relief and its obstacles.

Each memory may be connected to an auxiliary module or to the central module, or indeed be integrated into an auxiliary module or into the central module.

In this way, each auxiliary module monitors at least one parameter external to the system, performs analysis of said at least one parameter external to the system, and deduces from the analysis an actual or potential risk relating to operation of the system.

Then, an overall risk level is determined by means of the central module, by combining the previously established actual or potential risks relating to the system and to the parameters external to the system, and their effects on the system are also determined by means of the central module.

In one aspect, when the system is an aircraft, the source modules may include:
 at least one FADEC engine health check module;
 at least one module for monitoring the flight members of the aircraft; and/or
 at least one module for controlling an avionics device.
In addition, the auxiliary modules may then include:
 at least one weather module;
 at least one module for monitoring the "Instrument Flight Rules" (IFR) and "Visual Flight Rules" (VFR) flight conditions;
 at least one module for monitoring the terrain;
 at least one module for monitoring the mission; and/or
 at least one module for monitoring the state of a pilot or driver.

The present invention also provides a device for managing risks and alerts for a system. Said device for managing risks and alerts is configured to implement the method as described above, and includes:
 a plurality of source modules for identifying actual or potential risks of failure or of malfunction of the system;
 a plurality of auxiliary modules for identifying actual or potential risks related to parameters external to said system and that might have impacts on operation of the system;
 a central module connected to the source modules and to the auxiliary modules, the central module including at least one computer and receiving information relating to the actual or potential risks of failure or of malfunction of the system; and
 at least one action and information interface for the pilot that is connected to the central module.

The present invention also provides a vehicle including such a device for managing risks and alerts.

In particular, the present invention provides an aircraft equipped with such a device for managing risks and alerts.

BRIEF DESCRIPTION OF THE DRAWINGS

The invention and its advantages appear in greater detail from the following description of examples given by way of illustration with reference to the accompanying figures, in which.

DETAILED DESCRIPTION

Elements present in more than one of the figures are given the same references in each of them.

Figure 1:
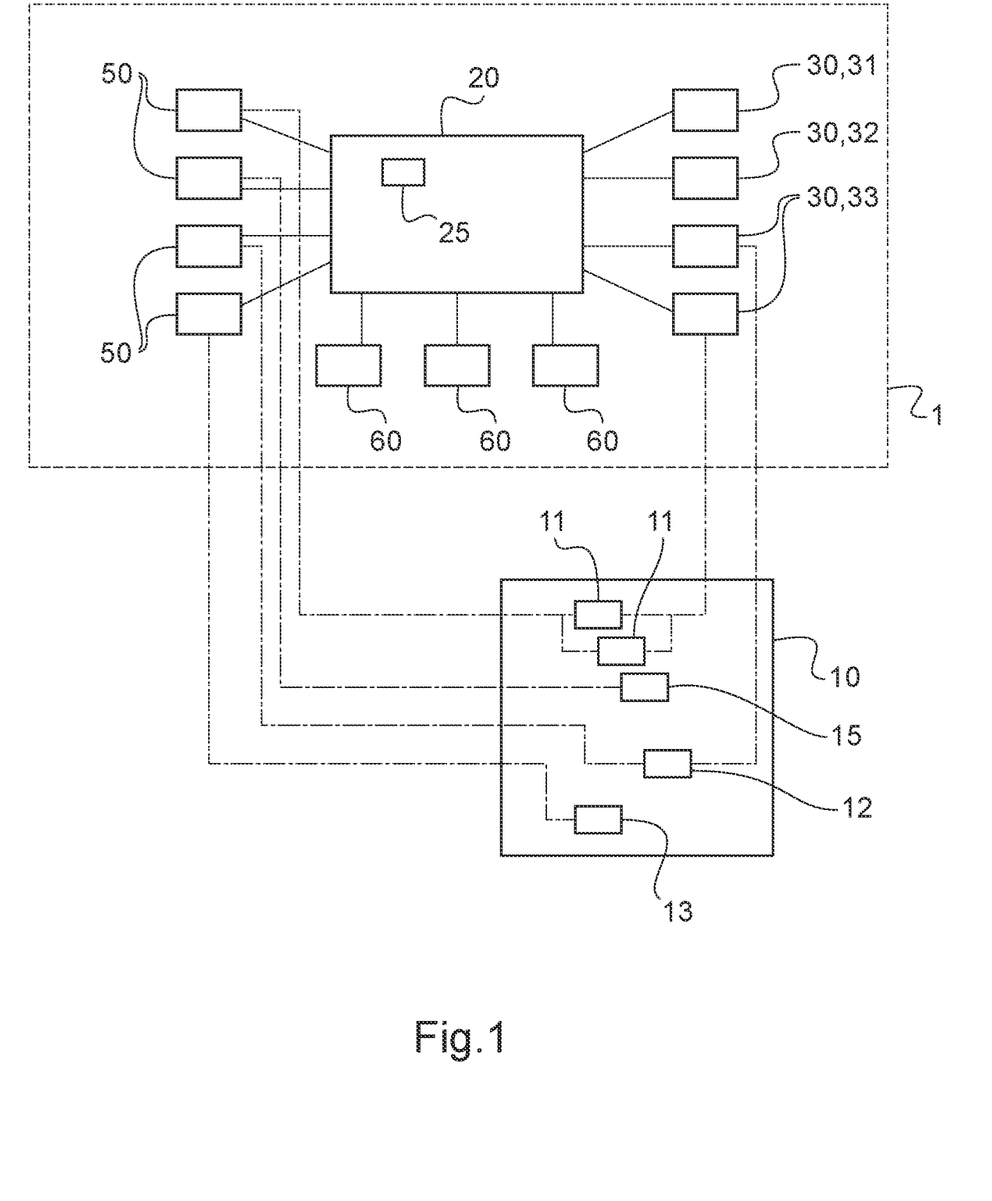
FIG. 1 shows a system connected to a device for managing risks and alerts.

FIG. 1 shows a device 1 for managing risks and alerts that is connected to a system 10, e.g. a mechanical system or a complex system. The system 10 may comprise various elements or devices 11 to 15, optionally grouped together to form a subsystem.

For example, the system 10 may include one or more engines or motors 11, which may, in particular, be fuel-burning engines or electric motors. The system 10 may also include a mechanical power transmission device 15 driven mechanically by one or more engines or motors 11. The system 10 may also include a control member 13, 14 for controlling the system 10. The system 10 may also include a device 12 for monitoring and controlling the system 10.

The device 1 for managing risks and alerts 1 comprises a plurality of source modules 50, a plurality of auxiliary modules 60, a central module 20, and at least one action and information interface 30.

Each source module 50 makes it possible to identify actual or potential risks of failures or of malfunction of the system 10. For example, each source module 50 may be connected to an element or device 11 to 15 of the system 10, or indeed to a subsystem of said system 10. In this way, each source module 50 enables the element or the device 11 to 15 of the system 10 or indeed the subsystem to be monitored in order to identify actual or potential risks of failures or of malfunction of the system 10 relating to that element or to that device 11 to 15 or indeed to that subsystem.

One or more source modules 50 may enable one or more parameters of the system 10 to be monitored in order to identify actual or potential risks of failures or of malfunction of the system 10 by means of that parameter or of those parameters of the system 10.

For example, a source module 50 may include one or more sensors or a specific device for measuring and monitoring current data relating to a parameter of the system 10, or to an element or device 11 to 15 of the system 10, or indeed to a subsystem of the system 10. For example, a source module 50 may include a computer for analyzing the current data relating to said element or said device 11 to 15, to said subsystem, or to said parameter.

A source module 50 may also include a memory or be connected to a memory storing past data relating to a parameter of the system 10, or to an element or device 11 to 15 of the system 10, or indeed to a subsystem of said system 10.

The source module 50 may then use the past data to identify actual or potential risks of failures or of malfunction of the system 10, e.g. by comparing the current data with the past data.

Each auxiliary module 60 enables actual or potential risks to be identified that are related to parameters external to the system 10 and that might have impacts on operation of the system 10. One or more auxiliary modules 60 may, in particular, serve to monitor one or more parameters of the environment of the system 10 as well as parameters relating to the state of an operator of the system 10.

For this purpose, an auxiliary module 60 may include one or more sensors or a specific device for measuring and monitoring current data relating to parameters external to the system 10. An auxiliary module 60 may also include a computer for analyzing the current data relating to each parameter.

An auxiliary module 60 may also include a memory or be connected to a memory storing past data relating to one or more parameters external to the system 10.

The auxiliary module 60 may then use the past data to identify actual or potential risks of failures or of malfunction of the system 10, e.g. by comparing the current data with the past data.

Furthermore, for particular parameters external to the system 10, e.g. related to the weather, such as temperature, atmospheric pressure or indeed the presence of clouds or rain, an auxiliary module 60 may use forecasts relating to each of the parameters instead of or in addition to the current data.

For this purpose, an auxiliary module 60 may include a memory or be connected to a memory storing such forecasts. An auxiliary module 60 may also include a receiver in order to receive such a forecast relating to one or more parameters external to the system 10.

The auxiliary module 60 may then identify actual or potential risks of failures or of malfunction of the system 10 on the basis of each forecast, e.g. by analyzing each forecast and optionally by comparing it with the current data and/or with the past data.

The central module 20 is connected to the source modules 50, to the auxiliary modules 60 and to each action and information interface. In this way, the central module 20 can receive information on the actual or potential risks of failures or of malfunction of the system 10 from each source module 50 and/or from each auxiliary module 60. The central module 20 includes, in particular, at least one computer 25 in order to analyze and combine said information relating to the actual or potential risks of failures or of malfunction of the system 10.

In addition, the central module 20 may include at least one memory storing past data relating to the system 10 as well as to operation of the system and the effects of the actual or potential risks. The central module 20 can then simultaneously analyze the actual or potential risks relating to the system 10 and to the parameters external to the system 10, as well as the past data in order to determine the overall risk level.

Each action and information interface 30 for the pilot is connected to the central module 20.

An action and information interface 30 can thus serve to inform an operator of the system of the overall risk level, to alert said operator if the overall risk level so requires, to propose one or more actions on the system 10 to said operator as a function of said overall risk level, or even to act automatically on the system 10 if the overall risk level so requires, e.g. in order to preserve the system 10.

An action and information interface 30 may comprise a display device 31, such as a screen, serving to display the overall risk level, optionally together with information relating to the system 10 and/or to its environment and with one or more actions to be performed on the system 10 by the operator as a function of the overall risk level.

An action and information interface 30 may also comprise a warning device 32 in order to alert an operator of the system 10 to a possible risk on the system 10 as a function of the overall risk level. For example, the warning device 32 may be visual, vibratory, or audible.

An action and information interface 30 may also comprise a control device 33 for controlling the system 10. A control device 33 may be connected to one or more elements or devices 11 to 15 of the system 10. In this way, a control device 33 can control an element or devices 11 to 15 of the system 10, e.g. so as to perform one or more actions automatically on the system 10, and in particular on said element(s) or device(s) 11 to 15 of the system 10, as a function of the overall risk level.

Figure 2:
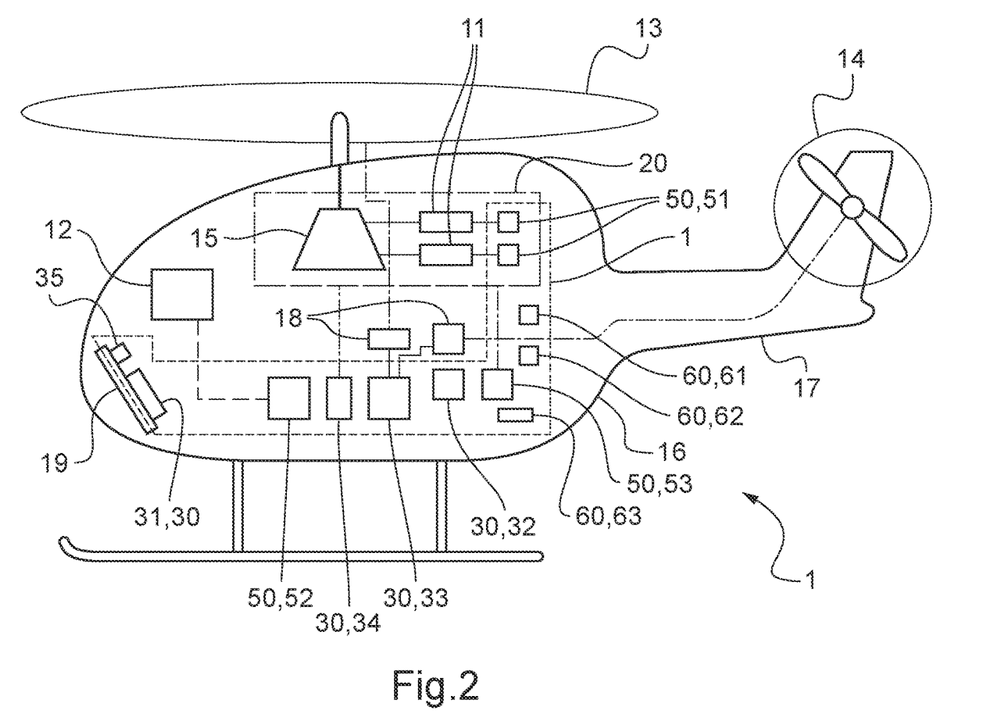
FIG. 2 shows an aircraft equipped with a device for managing risks and alerts.

Such a system 10 may, for example, be a vehicle and in particular an aircraft as shown in FIG. 2. Such a system 10 comprises a fuselage 16 and a tail boom 17 as well as a control member formed by a lift rotor 13 arranged above the fuselage 16 and another control member formed by an auxiliary rotor 14 arranged at the rear end of the tail boom 17. The system 10 further comprises two engines or motors 11 driving a mechanical power transmission gearbox 15 driving the lift rotor 13 and the auxiliary rotor 14 in rotation. The system 10 further comprises an instrument panel 19 and a monitoring and control device 12 formed by an avionics device provided in particular with various sensors and instruments enabling parameters to be measured or estimated, and enabling the values of said parameters to be indicated. This system 10 further comprises servocontrols 18 serving to control the lift rotor 13 and the auxiliary rotor 14 and in particular to modify the pitch settings of the blades of said rotors 13, 14. In this way, the lift rotor 13 and the auxiliary rotor 14 constitute control members for controlling said system 10 that serve to provide lift and propulsion for the aircraft and also to make changes in direction.

Finally, the system 10 further comprises a device 1 for managing risks and alerts.

The device 1 for managing risks and alerts includes source modules 50 and auxiliary modules 60. For example, two source modules 50 may be engine controllers 51, each connected to a respective engine 11 firstly for monitoring and controlling operation of the engine, and secondly for determining the actual or potential risks relative to each engine 11. For example, an engine controller 51 is a controller of the FADEC type.

A power plant 20 comprising the two engines 11, the two engine controllers 51 and the mechanical transmission gearbox 15 constitutes a subsystem of said system 10. A source module 50, 53 may be connected to said power plant 20 in order to monitor operation of it and in order to determine the actual or potential risks relating to said power plant 20.

A source module 50, 52 may also be connected to the avionics device 12 in order to monitor firstly the avionics device 12 and operation of it, and secondly certain operating parameters of the system 10, e.g. the altitude of the aircraft, its speed, its position, etc. In this way, the source module 50, 52 may monitor operation of the system 10 and determine the actual or potential risks relating to said parameters and/or to the avionics device 12.

An auxiliary module 60, 61 may be dedicated, as described above, to monitoring parameters external to the system 10 and relating to the weather.

An auxiliary module 60, 62 may be dedicated to monitoring the surrounding terrain and an auxiliary module 60, 63 may be dedicated to monitoring the state of the pilot of the aircraft.

Finally, the device 1 for managing risks and alerts further comprises a plurality of action and information interfaces 30. As mentioned above, an interface 30 may, for example, comprise a display device 31, such as a screen, arranged on the instrument panel 19 and/or a warning device 32.

An interface 30 may also comprise one or more control devices 33, 34 connected, for example, respectively to the rotors 13, 14 and to the power plant 20. In this way, the control device 33 can control the servocontrols 18 in order to control the lift rotor 13 and the auxiliary rotor 14, and the control device 34 can act on the power plant 20 and in particular on the engines 11.

Figure 3:
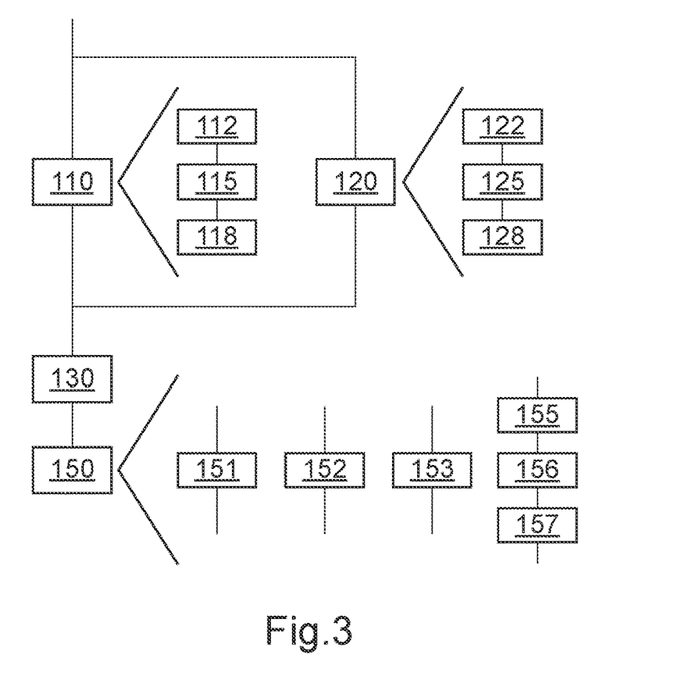
FIG. 3 is a flow chart showing a method of managing risks and alerts of a system.

A device 1 for managing risks and alerts is configured to implement a method of managing risks and alerts, a flow chart of the method being shown in FIG. 3. This method comprises a plurality of steps.

Firstly, a determination step 110 for determining at least one actual or potential risk of failure or of malfunction of the system 10 is performed by means of at least one source module 50.

This determination step 110 can, in particular, enable an actual or potential risk relating to an engine 11 of the aircraft to be determined, e.g. by conducting a health check before a flight or during a flight by means of the engine controllers 51 and by identifying any loss of power of said engine 11 or indeed any significant ageing of said engine 11.

Said determination step 110 can also enable an actual or potential risk relating to operating parameters of the aircraft to be determined by means of the source module 50, 52 connected to the avionics device 12.

Figure 4:
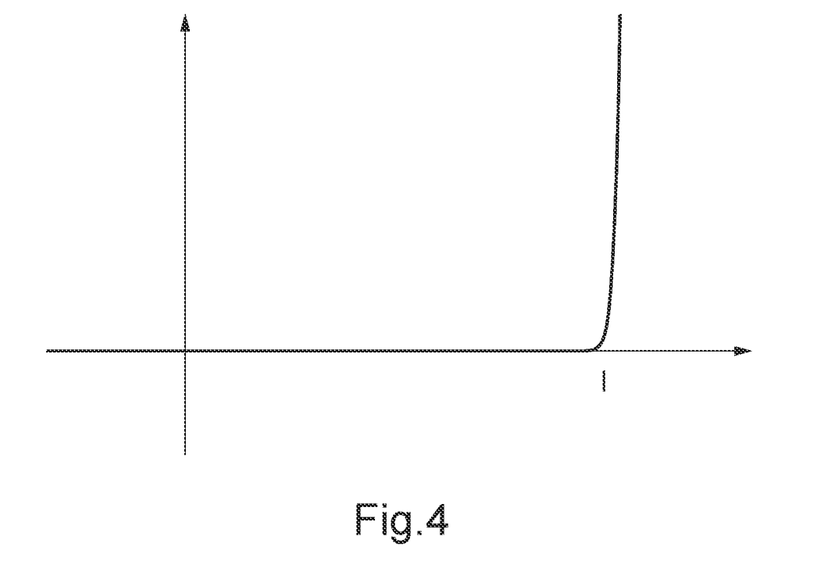
FIGS. 4 to 6 show curves of parameters related to the system.

A curve relating to a risk associated with a parameter of the aircraft is shown in FIG. 4. For example, this curve represents the risk associated with the variation in speed relative to air or else with the variation in altitude of the aircraft. Indeed, for both of these parameters, a maximum value, namely an overspeed or a maximum altitude, must not be exceeded, otherwise a risk might be run by the aircraft. The risk associated with each of these parameters may therefore be expressed by the following formula: $R=\exp(x-l)$, where:
x is the current value of the parameter;
l is the maximum value for the parameter; and
exp is the mathematical exponential function.

Figure 5:
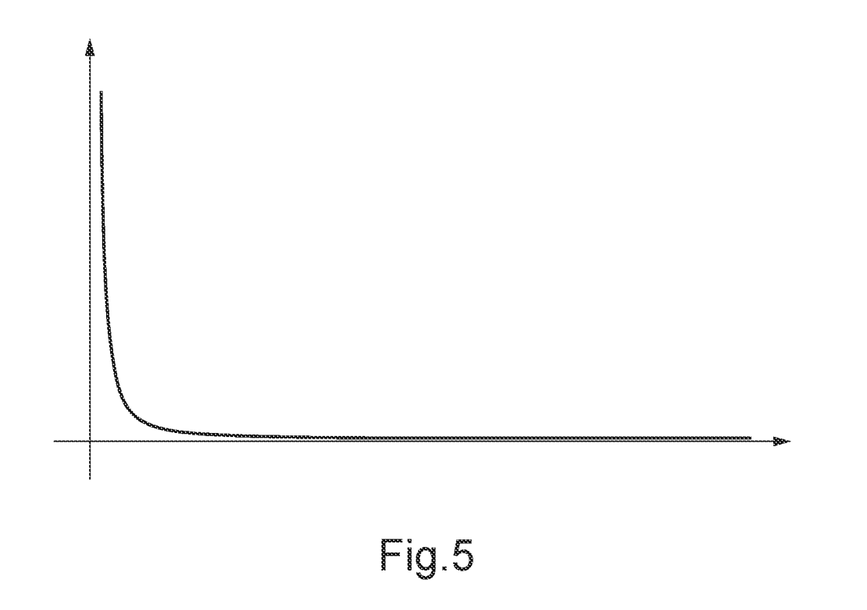

A curve relating to a risk associated with another parameter of the aircraft is shown in FIG. 5. For example, this curve represents the risk associated with the variation in the height of the aircraft relative to the ground. Indeed, for this parameter, a minimum value equal to zero or greater than zero, with a safety margin being kept, should not be exceeded, in order to avoid any contact with the ground, naturally except for when landing. The risk associated with this parameter of height relative to the ground may therefore be expressed by the following formula: $R=\exp(1/x)-1$, where:
x is the current value of the height relative to the ground; and
exp is the mathematical exponential function.

The determination step 110 may comprise substeps, as shown in FIG. 3. Thus, a measurement substep 112 is performed in order to measure at least one characteristic of an element or of a device 11 to 15 of the system 10, at least one characteristic of a subsystem 20 of the system 10 or at least one parameter of the system 10, followed by a substep 115 for analyzing this at least one characteristic. Finally, a computation substep 118 is performed, e.g. by a computer of the source module 50 in order to compute at least one actual or potential risk of failure or of malfunction of the system 10, which risk is associated with said at least one characteristic.

Then, a determination step 120 for determining at least one actual or potential risk that is related to parameters external to the system 10 and that might have an impact on operation of the system 10 is performed by means of at least one auxiliary module 60.

The determination step 120 may comprise substeps, as shown in FIG. 3. A measurement substep 122 is thus performed in order to measure at least one parameter external to the system 10, followed by an analysis substep 125 for analyzing said at least one external parameter external to the system 10. Then, a computation substep 128 is performed, e.g. by a computer of the source module 60 in order to compute at least one actual or potential risk associated with said at least one parameter external to the system 10.

Figure 6:
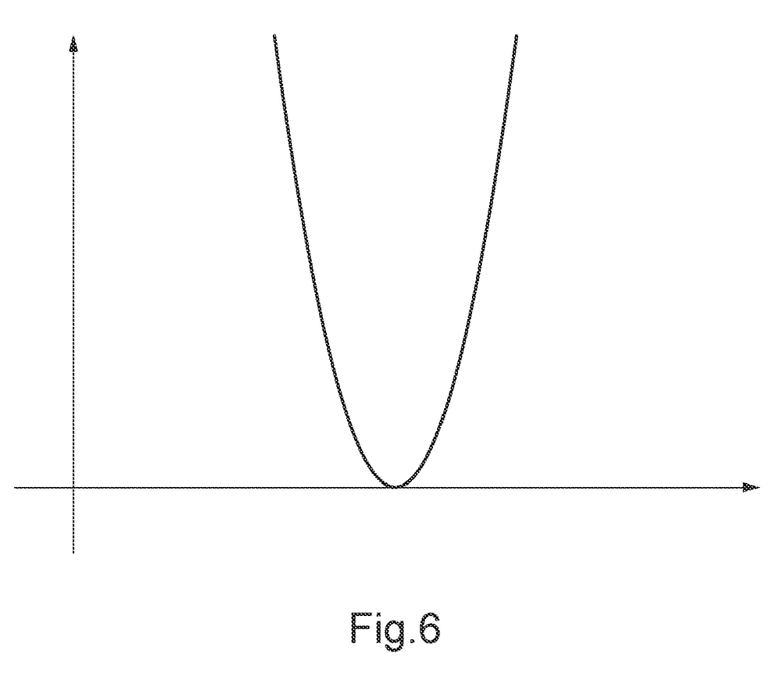

For example, a curve relating to a risk associated with a parameter of the aircraft may be shown in FIG. 6. For example, this curve represents the risk associated with light that may or may not allow a flight to be flown under VFR conditions, i.e. flown by the pilot visually. Indeed, the risk associated with flying under VFR conditions is related to the light and to the visibility that a pilot might have. Ignoring weather conditions, the risk related to lack of light is, for example, zero when the sun is at its zenith, and maximum during the night, and can follow a parabolic function of time as shown in FIG. 6. The risk associated with this parameter may therefore be expressed by the following formula: $R=a \cdot t^2 + b \cdot t + c$, where:
t is the current value of time, i.e. what the current time is;
"·" is the mathematical multiplication function;
"+" is the mathematical addition function; and
a, b, c are coefficients that are variable as a function of the sunrise and sunset times.

The determination steps 110, 120 are preferably performed in parallel and simultaneously, in particular in order to optimize the time taken to perform the method of the invention. However, the determination steps 110, 120 may be performed sequentially.

Then, a determination step 130 for determining an overall risk level by combining the actual or potential risks and their effects on the system 10 is performed by means of the central module 20.

The overall risk level may, for example, be equal to an arithmetic sum or to a quadratic sum of the actual or potential risks. For example, the overall risk level may also be determined by a specific formula or indeed by an algorithm.

The central module 20 may use an expert system, artificial intelligence, or indeed a neuronal system to determine the overall risk level.

Furthermore, the determination step 130 for determining an overall risk level may take into account weighting coefficients associated with each actual or potential risk relating to the system 10 or to its environment. For example, each weighting coefficient may correspond to a criticality level associated with each element or device 11 to 15 of the system 10, with each subsystem and with each parameter of the system 10, as well as with each parameter external to the system 10 that are monitored by the source modules 50 and by the auxiliary modules 60. For example, the overall risk level may be equal to an arithmetic sum weighted using the following formula:

$$R_C = \sum_{i=1}^{n}(Cp_i \cdot R_i),$$

where:
Σ is the mathematical sum function;
i is the rank in the sum;
n is the total number of actual or potential risks to be taken into account;
"·" is the mathematical multiplication function;
$R_i$ is the actual or potential risk of rank i; and
$Cp_i$ is the weighting coefficient associated with the risk of rank i.

The overall risk level may also be equal to a weighted quadratic sum of the actual or potential risks. For example, the overall risk level may also be determined by a specific formula or indeed by an algorithm, e.g. involving said weighting coefficients.

The weighting coefficients associated with each risk may be stored in a memory that is connected to the central module 20 or indeed that is integrated into the central module 20.

Finally, a control step 150 for controlling said at least one action and information interface 30 as a function of the overall risk level is performed by means of the central module 20 controlling said at least one action and information interface 30.

For example, said at least one action and information interface 30 may comprise a display device 31.

In particular, the control step 150 may include a display substep 151 in order to display on the display device 31 the overall risk level and/or information relating to the system 10 and/or to its environment. The display substep 151 may also display tasks or actions to be performed by the operator in order to take into account the overall risk level and/or in order to lower that overall risk level. In this way, the control step 150 enables an operator of the system 10 to be informed of the overall risk level and optionally to be presented with the actions that are appropriate and timely in view of the circumstances.

The control step 150 may also include a warning substep 152 in order to alert an operator of the system 10 via the warning device 32 as a function of the overall risk level if the overall risk level so requires. For example, the alert may be visual, vibratory, or audible.

The control step 150 may also include an action substep 153 in order to perform one or more actions on the system 10 automatically as a function of the overall risk level by means of the control device 33. Indeed, when the overall risk level is high, it can be necessary, or even essential, to act urgently on the system 10 and to perform one or more actions in order to avoid occurrence of a failure of the system 10, or even damage to the system 10.

Consequently, the fastest and most effective way is to perform the action(s) on the system 10 automatically, by means of the control device 33, so as to preserve the system 10, for example. For example, such action may be to shut down the system 10 or else to shut down at least one of its engines 11 or a subsystem. For example, when the system 10 is an aircraft, such action may also be a change of direction to avoid a collision or else to go round a risk zone.

The control step 150 may also include various substeps, namely a display substep 155, a validation substep 156, and an action substep 157.

The display substep 155 serves to display on the display device 31 one or more actions to be performed as a function of the overall risk level, and optionally the overall risk level and additional information about the system 10 and operation of said system 10. For example, such action to be performed may be to shut down the system 10 or else to shut down at least one of its engines 11 or a subsystem. Such an action is recommended by the method of the invention as a function of the overall risk level and of the circumstances, but the choice of whether to perform one or more of such actions is left to the operator of the system 10. The operator may then decide to perform said actions himself.

The operator may also decide to validate, during the validation substep 156, one or more of these proposed actions by means of a validation device 35. A validation device 35 may be the display device 31, which is, for example, a touch screen, or else a button, a keyboard or any appropriate device arranged, for example, on the instrument panel 19.

Then, each validated action is performed automatically during the action substep 157 by means of the control device 33.

The action and information interfaces 30 thus advantageously enable various tasks to be proposed as a function of the overall risk level and of the circumstances so as to inform, alert or propose actions to an operator of the system 10, or indeed so as to act automatically on the system 10 if necessary.

Figure 7:
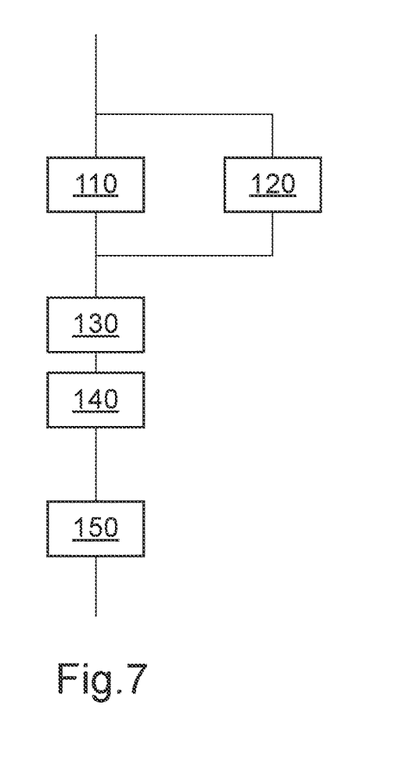
FIG. 7 is a flow chart showing a method of managing risks and alerts of a system.

Furthermore, the method of the invention may further comprise an additional computation step 140 for computing an intermediate level of risk as a function of certain actual or potential risks relating to the system 10 or to parameters external to the system 10, as indicated in the flow chart shown in FIG. 7. Indeed, source modules 50 and/or auxiliary modules 60 may be interconnected, independently of the central module 20 in order to combine actual or potential risks upstream from the central module 20. This intermediate computation step 140 concerns, in particular, actual or potential risks that are related to one another.

For example, the actual or potential risk relating to flying under VFR conditions depends not only on light as mentioned above, but also on the weather conditions. Indeed, even when the sun is at its zenith, clouds or fog can prevent flying under VFR conditions.

Consequently, an intermediate level of risk relating to flying under VFR conditions may be computed during the additional computation step 140 as a function of the actual or potential risks relating to light, presence of clouds, presence of fog and/or presence of rain, for example. This intermediate level of risk relating to flying under VFR conditions can then be used by the central module 20 and combined with the other actual or potential risks in order to determine the overall risk level of the system 10.

The auxiliary modules 50 relating to these various parameters external to the system 10 may then be mutually associated, upstream from the central module 20, in order to perform this additional computation step 140 for computing an intermediate level of risk.

These actual or potential risks relating to light, presence of clouds, presence of fog, and presence of rain can also be used by the central module 20 to determine the overall risk level of the system 10. However, this additional computation step 140 may advantageously make it possible to relieve the central module 20 of certain tasks, and optionally to reduce the time taken to determine the overall risk level of the system 10.

The following is an example of determining an overall level or risk when the system 10 is an aircraft.

During the flight of the aircraft, an engine controller 51 detects that the potential of an engine 11 is very advanced and determines a high actual risk associated with said engine 11 that can be a risk of total failure of the engine 11. In addition, the weather conditions on the planned path of the aircraft are changing and are deteriorating relative to the initial forecast. The method of the invention is informed of this change in the weather by means of the receiver that is included in the auxiliary module 61 relating to the risk associated with the weather and that is receiving new weather forecasts. The actual and potential risk associated with these weather conditions therefore increases accordingly.

In addition, the flight plan in progress is under VFR conditions.

The central module 20 receives and analyzes the various actual risks and the overall risk level increases. The central module 20 transmits instructions to the display device 31 in order to display information representing this overall risk to the pilot who continues the mission in the knowledge, in particular, of these changes in the weather.

The new weather forecasts received by the auxiliary module 61 reveal a more significant further deterioration in the weather conditions on the path of the aircraft so that over certain zones, the weather conditions are such that flying under VFR conditions is not possible, with only flying under IFR conditions being possible. The actual and potential risks relating to the weather conditions and to the flight conditions increase accordingly.

The central module 20 analyses the new actual and potential risks and the overall risk level increases again. The central module 20 then transmits new instructions to the display device 31 for displaying the change to the pilot, and proposes a new route so as to avoid the zone in which flying under VFR conditions is not possible, and that also avoids populated zones or zones with trees, due to the risk of a total failure of the engine, which would require an emergency landing maneuver to be performed. The pilot is informed and can then accept the new flight plan and validate it by means of the validation device 35.

The control device 33 receives instructions relating to the new flight plan and transmits the new instructions to the servocontrols 18 of the aircraft. The pilot continues the mission without stress or work overload. The safety margins are maintained and the risks of accidents are eliminated.

Naturally, the present invention may be subjected to numerous variations as to its implementation. Although several implementations are described above, it should readily be understood that it is not conceivable to identify exhaustively all possible implementations. It is naturally possible to envisage replacing any of the means described by equivalent means without going beyond the ambit of the present invention.

What is claimed is:

1. A method of managing risks and alerts for a system, the system being an aircraft and including:
    a plurality of source modules for identifying actual or potential risks of failure or of malfunction of the system;
    a plurality of auxiliary modules for identifying actual or potential risks that are related to parameters external to the system and that might have impacts on operation of the system;
    a central module connected to the source modules and to the auxiliary modules, the central module including at least one computer and receiving information relating to the actual or potential risks of failure or of malfunction of the system;
    at least one action and information interface for an operator of the system, the at least one action and information interface being connected to the central module;
    a lift rotor;
    an auxiliary rotor; and
    at least one engine driving a mechanical power transmission gearbox driving the lift rotor and the auxiliary rotor in rotation;
    the method comprising the following steps:
        determining at least one actual or potential risk of failure or of malfunction of the system by means of at least one source module;
        determining at least one actual or potential risk that is related to parameters external to the system and that might have an impact on operation of the system, by means of at least one auxiliary module;
        determining an overall risk level by combining the actual or potential risks and their effects on the system by means of the central module; and
        controlling the at least one action and information interface as a function of the overall risk level; and
        wherein, with the at least one action and information interface including a control device for controlling the aircraft, controlling the at least one action and information interface includes an action substep performed by means of the control device, the action substep performs at least one action on the lift rotor, the auxiliary rotor, and the at least one engine or the mechanical power transmission gearbox, automatically by means of the control device as a function of the overall risk level.

2. The method according to claim 1,
    wherein, with the at least one action and information interface further including a display device, controlling the at least one action and information interface further includes a display substep for displaying the overall risk level and/or information relating to the system and/or to its environment on the display device.

3. The method according to claim 1,
wherein, with the at least one action and information interface further including a warning device, controlling the at least one action and information interface further includes a warning substep alerting an operator of the system as a function of the overall risk level by means of the warning device.

4. The method according to claim 1,
wherein, with the at least one action and information interface further including a display device and a validation device, controlling the at least one action and information interface further includes a display substep for displaying, on the display device, one or more actions to be performed and a validation substep for validation by an operator of the system by means of the validation device, the operator validating at least one action proposed during the validation substep by means of the validation device, and each validated action being performed automatically by means of the control device as a function of the overall risk level.

5. The method according to claim 1,
wherein determining the overall risk level is performed while using a weighting associated with each actual or potential risk relating to the system or to its environment.

6. The method according to claim 1,
wherein determining at least one actual or potential risk of failure or of malfunction of the system comprises the following substeps:
measuring at least one characteristic of an element of the system, at least one characteristic of a device of the system, at least one characteristic of a subsystem of the system or at least one parameter of the system;
analyzing the at least one characteristic; and
computing at least one actual or potential risk of failure or of malfunction of the system, which risk is associated with the at least one characteristic.

7. The method according to claim 1,
wherein determining at least one actual or potential risk associated with parameters external to the system comprises the following substeps:
measuring at least one parameter external to the system;
analyzing the at least one parameter external to the system; and
computing at least one actual or potential risk associated with the at least one parameter external to the system.

8. The method according to claim 1,
wherein determining the overall risk level is performed by means of an expert system, of artificial intelligence, or of a neuronal system.

9. The method according to claim 1,
wherein the information relating to the actual or potential risks related to the parameters external to the system concern weather conditions, flight conditions, a terrain and relief of the terrain, a purpose of a mission flown by the aircraft and a path of the aircraft, and a state of a pilot of the aircraft.

10. The method according to claim 1,
wherein the information relating to the actual or potential risks of failures or of malfunctioning of the system relate to engine health monitoring, monitoring of the aircraft, and/or to performance of the aircraft.

11. The method according to claim 1,
wherein the method further comprises an additional computation step for computing an intermediate level of risk as a function of certain actual or potential risks relating to the system or to parameters external to the system, the intermediate level of risk being used by the central module and combined with the other actual or potential risks to determine the overall risk level of the system.

12. A device for managing risks and alerts for an aircraft having a lift rotor, an auxiliary rotor, and at least one engine driving a mechanical power transmission gearbox driving the lift rotor and the auxiliary rotor in rotation, the device comprising:
a plurality of source modules for identifying actual or potential risks of failure or of malfunction of the aircraft;
a plurality of auxiliary modules for identifying actual or potential risks that are related to parameters external to the aircraft and that might have impacts on operation of the aircraft;
a central module connected to the source modules and to the auxiliary modules, the central module including at least one computer and receiving information relating to the actual or potential risks of failure or of malfunction of the aircraft; and
at least one action and information interface for an operator of the aircraft, the at least one action and information interface is connected to the central module and includes a control device for controlling the aircraft;
wherein the central module is configured to determine an overall risk level by combining the actual or potential risks and their effects on the aircraft; and
the central module is further configured to control the at least one action and information interface as a function of the overall risk level such that at least one action on the lift rotor, the auxiliary rotor, and the at least one engine or the mechanical power transmission gearbox is taken automatically by the control device of the at least one action and information interface as a function of the overall risk level.

13. An aircraft comprising:
a lift rotor;
an auxiliary rotor;
at least one engine driving a mechanical power transmission gearbox driving the lift rotor and the auxiliary rotor in rotation; and
a device for managing risks and alerts for the aircraft, the device including
a plurality of source modules for identifying actual or potential risks of failure or of malfunction of the aircraft;
a plurality of auxiliary modules for identifying actual or potential risks that are related to parameters external to the aircraft and that might have impacts on operation of the aircraft;
a central module connected to the source modules and to the auxiliary modules, the central module including at least one computer and receiving information relating to the actual or potential risks of failure or of malfunction of the aircraft; and
at least one action and information interface for an operator of the aircraft, the at least one action and information interface is connected to the central module and includes a control device for controlling the aircraft;
wherein the central module is configured to determine an overall risk level by combining the actual or potential risks and their effects on the aircraft; and the central module is further configured to control the at least one action and information interface as a function of the overall risk level such that at least one action on the lift rotor, the auxiliary rotor, and the at least one engine or the mechanical power transmission gearbox is taken automatically by the control device of the at least one action and information interface as a function of the overall risk level.

14. The device according to claim 12,
wherein the at least one action and information interface further includes a display device; and
the central module is further configured to control the at least one action and information interface such that the display device displays the overall risk level and/or information relating to the aircraft and/or to its environment.

15. The device according to claim 12,
wherein the at least one action and information interface further includes a warning device; and
the central module is further configured to control the at least one action and information interface such that the warning device alerts the operator of the aircraft as a function of the overall risk level.

16. The device according to claim 12,
wherein the at least one action and information interface further includes a display device and a validation device; and
the central module is further configured to control the at least one action and information interface such that the display device displays one or more actions for validation by the operator of the aircraft with each action validated by the operator of the aircraft via the validation device being performed automatically by the control device as a function of the overall risk level.

17. The device according to claim 12,
wherein the information relating to the actual or potential risks related to the parameters external to the aircraft concern weather conditions, flight conditions, a terrain and relief of the terrain, a purpose of a mission flown by the aircraft and a path of the aircraft, and a state of a pilot of the aircraft.

18. The device according to claim 12,
wherein the information relating to the actual or potential risks of failures or of malfunctioning of the aircraft relate to engine health monitoring, monitoring of the aircraft, and/or to performance of the aircraft.

19. The aircraft according to claim 13,
wherein the information relating to the actual or potential risks related to the parameters external to the aircraft concern weather conditions, flight conditions, a terrain and relief of the terrain, a purpose of a mission flown by the aircraft and a path of the aircraft, and a state of a pilot of the aircraft.

20. The aircraft according to claim 13,
wherein the information relating to the actual or potential risks of failures or of malfunctioning of the aircraft relate to engine health monitoring, monitoring of the aircraft, and/or to performance of the aircraft.

* * * * *